United States Patent
Pering et al.

(10) Patent No.: US 8,456,381 B2
(45) Date of Patent: Jun. 4, 2013

(54) DEVICE, SYSTEM, AND METHOD OF PROVIDING AN EXTENDED DISPLAY WITH DESIRED RELATIVE DISPLAY ORIENTATION

(75) Inventors: Trevor A. Pering, San Francisco, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 957 days.

(21) Appl. No.: 12/058,805

(22) Filed: Mar. 31, 2008

(65) Prior Publication Data

US 2009/0243959 A1 Oct. 1, 2009

(51) Int. Cl.
*G09G 5/00* (2006.01)

(52) U.S. Cl.
USPC .......................................................... 345/2.3

(58) Field of Classification Search
USPC ................. 345/1.1, 1.2, 1.3, 2.1, 2.2, 2.3
See application file for complete search history.

(56) References Cited

U.S. PATENT DOCUMENTS

| | | | | |
|---|---|---|---|---|
| 6,859,219 B1* | 2/2005 | Sall | | 345/1.1 |
| 7,333,879 B2* | 2/2008 | Takizawa et al. | | 700/259 |
| 7,808,492 B2* | 10/2010 | Yamauchi et al. | | 345/204 |
| 2005/0168399 A1* | 8/2005 | Palmquist | | 345/1.1 |
| 2006/0031014 A1* | 2/2006 | Sato et al. | | 701/224 |
| 2007/0046561 A1* | 3/2007 | Cheon et al. | | 345/1.1 |
| 2007/0273609 A1* | 11/2007 | Yamaguchi et al. | | 345/1.1 |
| 2008/0055271 A1* | 3/2008 | Yamaguchi et al. | | 345/173 |
| 2008/0242360 A1* | 10/2008 | Jang et al. | | 455/566 |
| 2009/0036213 A1* | 2/2009 | Masuyama et al. | | 463/37 |
| 2009/0160731 A1* | 6/2009 | Schuler et al. | | 345/1.1 |
| 2009/0167633 A1* | 7/2009 | Cohen et al. | | 345/1.1 |

* cited by examiner

*Primary Examiner* — Tom Sheng
(74) *Attorney, Agent, or Firm* — Kacvinsky Daisak PLLC

(57) ABSTRACT

Device, system, and method of providing an extended display area with a desired relative display orientation. In some demonstrative embodiments, a mobile device may include a primary display that is extendible onto a remote display; a context sensor to provide an indication of the desired relative display orientation between first and second portions of the extended display area; and a connection module to determine the desired relative display orientation based on the provided indication, to associate the primary and remote displays, and to automatically configure the extended display area with the desired relative display orientation. The indication may be responsive to a manipulation of the mobile device, for example, a tilting or a rotation of the device in a direction generally corresponding to the desired orientation. Other embodiments are described and claimed.

17 Claims, 3 Drawing Sheets

DEVICE, SYSTEM, AND METHOD OF PROVIDING AN EXTENDED DISPLAY WITH DESIRED RELATIVE DISPLAY ORIENTATION

BACKGROUND

A mobile device may include a display having a relatively fixed display area, which may not be big enough to allow convenient viewing of relatively large images, e.g., a large architectural blueprint, or a spreadsheet having a large number of rows and/or columns. Extending the primary display area onto a remote display may require a time-consuming configuration process, both to associate the displays and, additionally, to specify the relative positioning of graphics shown on the two displays.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
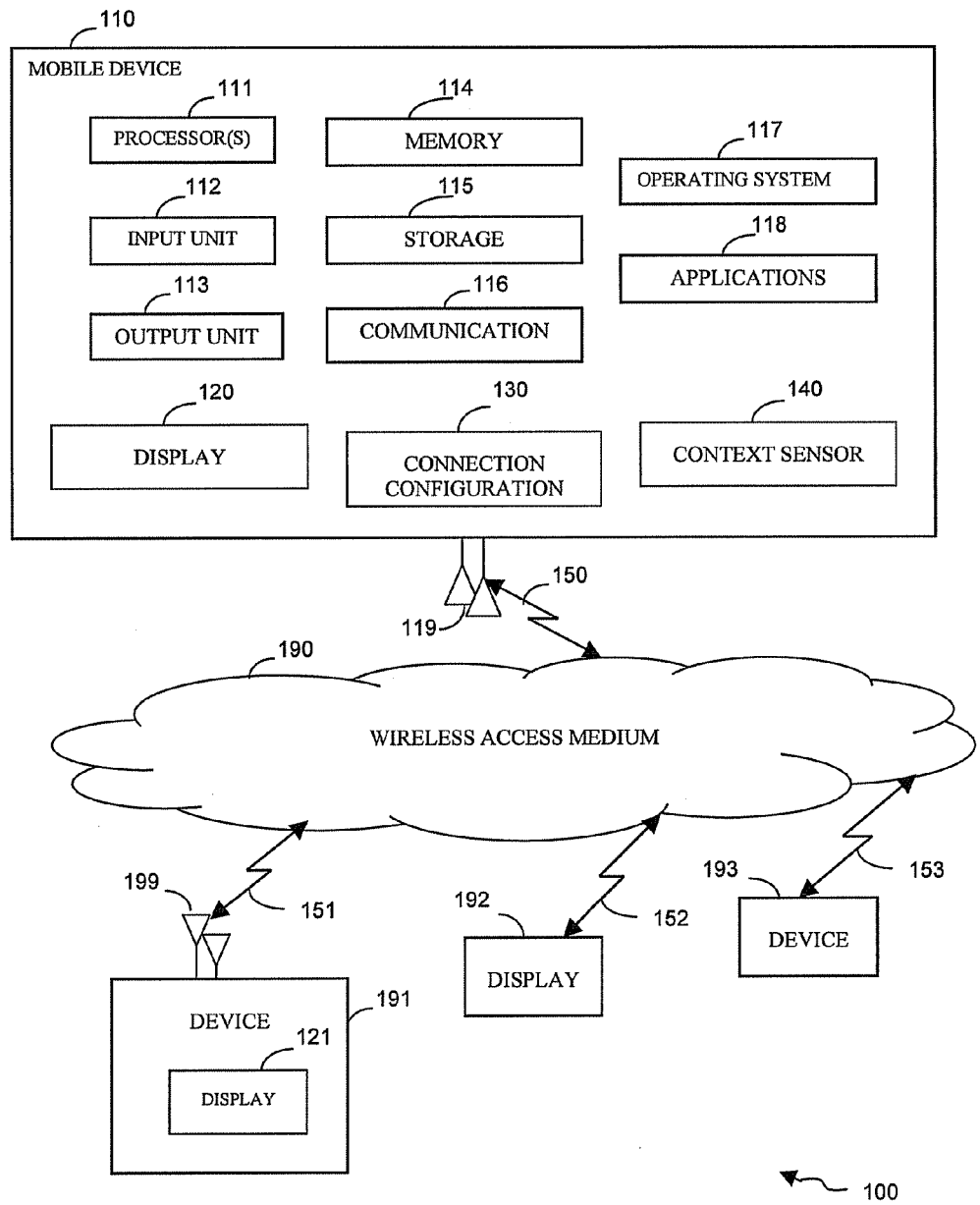
FIG. 1 is a schematic block diagram illustration of a system of providing an extended display area in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. In addition, the terms "plurality" and "a plurality" as used herein include, for example, "multiple" or "two or more". The terms "plurality" or "a plurality" may be used throughout the specification to describe two or more components, devices, elements, units, parameters, or the like.

Although portions of the discussion herein relate, for demonstrative purposes, to wireless links and/or wireless communications, embodiments of the invention are not limited in this regard, and may utilize wired communication and/or wireless communication. For example, some embodiments may include one or more wired or wireless links, may utilize one or more components of wired or wireless communication, may utilize one or more methods or protocols of wired or wireless communication, or the like.

Embodiments of the present invention may include apparatuses or modules for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. A "module" may be implemented using any suitable combination of software, hardware, memory, hardwired logic, and/or general-purpose or special-purpose processors, to provide a desired functionality.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a wireless LAN (WLAN), a Metropolitan Area Network (MAN), a wireless MAN (WMAN), a Wide Area Network (WAN), a wireless WAN (WWAN), a Personal Area Network (PAN), a wireless PAN (WPAN), devices and/or networks operating in accordance with existing IEEE 802.11, 802.11a, 802.11b, 802.11g, 802.11n, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a display capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

FIG. 1 schematically illustrates a block diagram of a system 100 in accordance with some demonstrative embodiments of the invention. System 100 includes, for example, a mobile device 110 able to communicate using a shared wireless access medium 190 with one or more other wireless devices 191-193, such as a wireless access point (AP), a wireless base station, a wireless communication device, a wireless communication station, and the like. Wireless communication medium 190 may include any suitable wireless communication link and/or connection, for example, a local wireless-connection, e.g., an IEEE 802.11 communication link, an IEEE 802.16 communication link, a Bluetooth communication link, an UWB communication link, or the like. Components of system 100 may communicate via using one or more wireless links such as links 150-153.

In some demonstrative embodiments, mobile device 110 includes an integral display 120 ("the primary display"), e.g., a screen integrated within the housing or body of mobile device 110. Display 120 may have a predefined display area. However, there may be occasions when a user of device 110 would like to display images requiring a display area larger than the display area of display 120, e.g., an extended display area, which is double, or triple the display area of display 120. For example, the user may like to view a relatively large architectural blueprint, to sort photographs, to open a spreadsheet with many columns and/or rows which are to be viewed simultaneously, and the like.

In some demonstrative embodiments, mobile device 110 may be capable of extending the display area provided by primary display 120 onto a remote display of one or more other wireless devices, e.g., of devices 191-193, to jointly provide a larger extended display area. For example, the remote display may be an integrated display 121, e.g., of device 191, or a stand-alone or fixed display 192 capable of wireless communication, e.g., a flat-screen LCD panel.

Wireless devices 110, 191, 192, and/or 193 include, for example, a laptop computer, a notebook computer, a tablet computer, a PDA device, a cellular phone, a mobile phone, a hybrid device, e.g., combining cellular phone functionalities with PDA device functionalities, a relatively small computing device, a "smart-phone", a non-desktop computer, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

Device 110 may include, for example, one or more processors 111, an input unit 112, an output unit 113, a memory unit 114, a storage unit 115, and a communication unit 116. Processor 111 executes instructions, for example, of an operating system (OS) 117 of device 110 and/or of one or more applications 118. Memory unit 114 and/or storage unit 115, for example, store data processed by device 110. Communication module 116 may be or may include, for example, a wireless radio frequency (RF) transceiver able to transmit and/or receive wireless RF signals, blocks, frames, transmission streams, packets, messages and/or data, e.g., through one or more antennas 119 and using wireless communication link 150. The one or more applications 118 may generate display information to be displayed on the extended display area jointly provided by primary display 120 and a remote display such as display 121 or 192. The display information may be communicated by communication module 116.

In some demonstrative embodiments, communication module 116 may include a short range high-bandwidth communication module, e.g., a UWB communication module. In other embodiments, communication module 116 may include any other suitable wireless communication module. In one example, as detailed below, wireless communication module 116 may include a connection configuration module 130 to configure the association of primary display 120 with the remote display, e.g. display 121, such that first and second portions of the extended display area, assigned to the primary and remote displays, are positioned relative to one another according to a desired logical orientation.

Device 110 may include other suitable hardware components and/or software components. For example, in some demonstrative embodiments device 110 includes a context sensor 140, for example, an accelerometer, a digital compass, a camera (either visual or infra-red), or other physical sensor suitable for gathering data and/or measuring parameters relating to a physical manipulation and/or orientation context of device 110. In some embodiments, context sensor 140 may be used to provide an indication of a desired relative display orientation between first and second portions of an extended display area to be assigned to the primary and remote displays, the indication being responsive to a manipulation of device 110, as described herein.

Figure 2A:
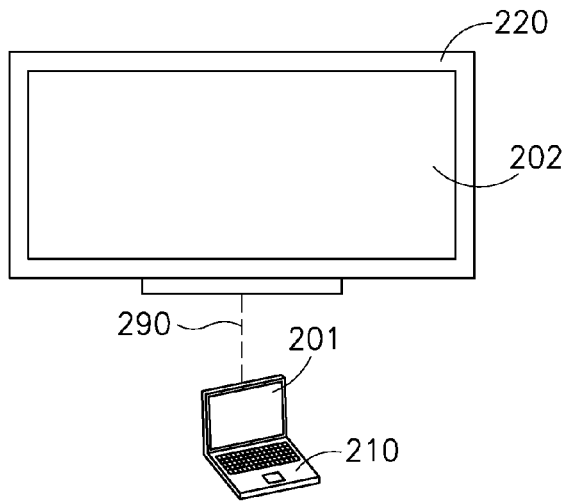
FIGS. 2A-2C schematically illustrate a system and method of providing an extended display area in accordance with one demonstrative embodiment of the invention.
Figure 2B:
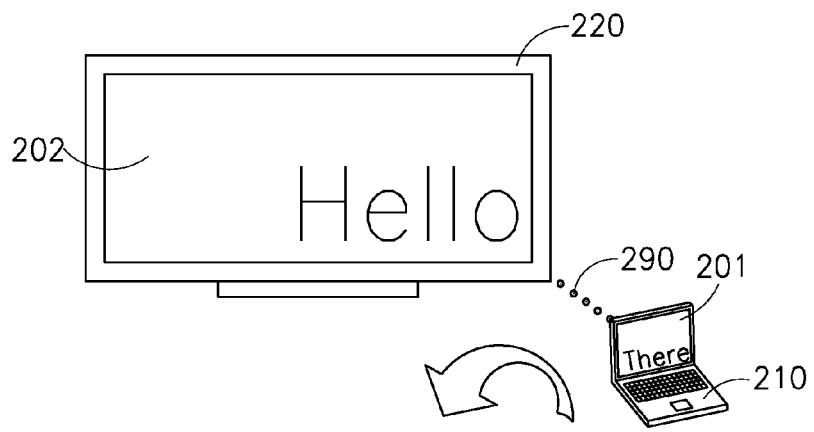
Figure 2C:

Reference is also made to FIGS. 2A-2C, which schematically illustrate determining the desired relative display orientation for an extended display in accordance with one demonstrative embodiment. Illustrated in FIGS. 2A-2C is an example of a scenario where a user of a mobile device 210 having a primary display 201 wishes to extend the display area onto a remote display 202 of another wireless device 220. For example, device 210 may be similar to device 110 described with reference to FIG. 1. Primary display 201 may have a limited display area. Remote display 202 may be a larger fixed-screen display situated in the same environment as device 210, e.g., having access to the wireless communication medium 190. Mobile device 210 may include one or more context sensors such as an accelerometer, a digital compass, a camera, or the like, to determine how the remote display 202 should be composed with the primary display 201.

In some embodiments, touching mobile device 210 to wireless device 220 may trigger association of the devices or displays, although embodiments of the invention are not limited in this regard. In some embodiments, it may not be necessary for the primary and remote displays to physically touch in order to determine the desired orientation. For example, Near Field Communication (NFC) or other suitable standard for proximate data transfer may be used to trigger a wireless connection between the two devices and extend the display 201 of the mobile device to the fixed display 202 using a wireless protocol. NFC, a technology similar to RFID, may be used to communicate information between electronic devices over a short range (typically under 5 cm), allowing electronic systems to detect when they are very near or touching each other. Furthermore, NFC allows devices to exchange information, such as their wireless MAC address and which services they support. From that point, a wireless link 290 may be formed between the two devices using a technology such as, for example, UWB or 802.11n. Technologies such as, for example, VNC (Virtual Network Computing) or MaxiVista may then be used to extend the logical display of the mobile device onto the remote display, similar to what happens with a VGA or other physical display cable is attached to the mobile device.

In accordance with demonstrative embodiments of the invention, the display area may be extended according to a desired relative display orientation for the positioning of graphics shown on the two associated displays. This may replace traditional methods such as, for example, use of a fixed display scheme or convention, such as, e.g., "always extend the display area to the right of the original device display", and/or of manually configuring the relative geometry for the extended display, e.g., as when adding additional wired displays and using a "display properties" configuration utility.

In some embodiments, the placement and/or orientation of the respective portions of the extended display area may be determined automatically, by using context information, e.g., provided by a context sensor embedded in the device, such as sensor 140, or from other context information. In one example, as shown in FIG. 2B, if mobile device 210 is tilted to the left, remote display 202 would be assigned a portion of the extended display positioned to the left of the portion assigned to primary display 201. As shown in FIG. 2C, if mobile device 210 is tilted to the right, remote display 202 would be assigned a portion of the extended display positioned to the right of the portion assigned to primary display 201. A context sensor such as an accelerometer could be used to identify the manipulation of the mobile device. Accordingly, tilting the mobile device may provide an indication of the desired relative display orientation between first and second portions of the extended display area.

In another example, a context sensor such as a digital compass may be used to provide an indication of the desired relative display orientation, based on a difference in rotation between the mobile device 210 and the other device 220. In yet another example, mobile device 210 and/or remote display device 220 may include a set of two or more NFC antennas (e.g., antennas 119 of device 110 or antennas 199 of device 191 in FIG. 1, respectively) that may function as a context sensor to provide information about an intended connection, while an embedded accelerometer provides an indication of the desired relative display orientation based on which direction the device is tilted. For example, the indication may be responsive to tilting or aiming the device to the left or right while bringing it within range of the particular NFC antenna for triggering a connection. In some embodiments, the indication may be based on which particular antenna of the set is used to scan the NFC tag.

Figure 3:
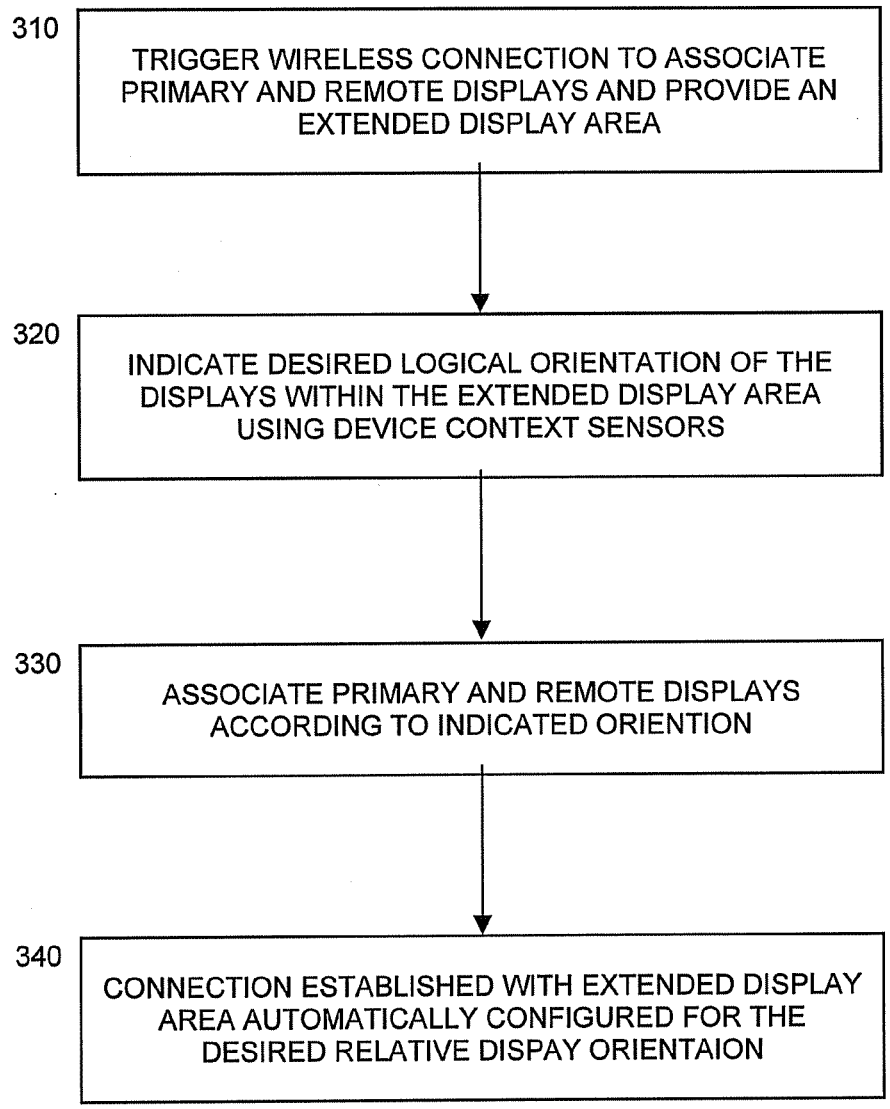
FIG. 3 is a schematic flow-chart illustration of a method of providing an extended display area in accordance with some demonstrative embodiments.

Reference is now made to FIG. 3, which schematically illustrates a method 300 of providing an extended display area in accordance with some demonstrative embodiments. In some non-limiting embodiments, one or more operations of FIG. 3 may be performed by a mobile device, e.g., mobile device 110 (FIG. 1) or mobile device 210 (FIGS. 2A-2C), to automatically configure the extended display area with a desired relative display orientation between first and second portions of the extended display area to be assigned to primary and remote displays.

As indicated at block 310, the method may include triggering a wireless connection between a mobile device having a primary display and a wireless device having a remote display, to associate the displays and jointly provide an extended display area. As used herein, the term "triggering a wireless connection" may include one or more stages of wireless communication, including, for example, forming a Layer-3 (TCP/IP) connection, establishing a Secure Socket Layer (SSL) connection, or client/server connection between compatible applications. For example, an NFC scan may be used to trigger basic display composition and to form a high-bandwidth wireless between the devices, e.g., between devices 110 and 191. Any other suitable channel association technique may be used to form the high-bandwidth connection and allow extending the primary display 120 of mobile device 110 to the remote display 121 of wireless device 191.

As indicated at block 320, the method may include indicating a desired logical orientation of the displays within the extended display area, for example, by using the device context sensor. In some embodiments, a user of the mobile device may tilt or rotate the device in a direction corresponding to the desired relative display orientation. An integrated context sensor of the device, e.g., an accelerometer, may sense the tilting or other manipulation, and provide an indication of the desired orientation in response. As indicated at block 330, the method includes associating the primary and remote displays according to that indication. For example, if the device is tilted or rotated to the left, to the right, forwards, or backwards, then the portion assigned to the remote display in the extended display area may be placed to the left of, to the right of, above, or below the portion assigned to the primary display, respectively.

Accordingly, in some demonstrative embodiments of the invention a wireless connection between the primary and remote displays may be established (block 340) with the extended display area automatically configured with the desired relative display orientation, as indicated by a user of the device through a manipulation of the device that is identified by the context sensor. Other operations or sets of operations may be used in accordance with some embodiments.

Embodiments of the invention may be applied in a variety of systems and methods. For example, some embodiments may relate to an Ultra Mobile Device (UMD) and to methods of utilizing a fixed display (e.g., flat-screen LCD panel) situated in a user's home. In another example, some embodiments may relate to two laptop devices that wish to share display resources (e.g., wirelessly extend the display of one laptop onto the other) and to methods of determining which display is on the left, and which is on the right. In yet another example, some embodiments may relate to Dynamically Composable Computing (DCC) systems and/or Carry Small Live Large (CSLL) devices and methods of streamlining dynamic composition between mobile devices and other displays.

Some embodiments of the invention may apply platform context to the composition process to help define some of the composition parameters. For example, a context-aware display composition technique using NFC and sensors combines multiple steps of the composition process necessary to completely specify the relationship between displays (e.g. wireless connection, display extension & geometric relationship), and may significantly reduce user overhead in associating displays for defining a composition. This may be advantageous for dynamically extending the display of a mobile device.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A mobile communication device comprising:
   a primary display that is wirelessly extendible onto a remote display;
   a context sensor to provide an indication of a desired relative display orientation between first and second portions of an extended display area to be assigned to said primary and remote displays, said indication being responsive to a tilting or a rotation of said device; and
   a connection module to determine the desired relative display orientation of the primary and remote displays based on said indication corresponding to a direction of said tilting or rotation, to associate said primary and remote displays to jointly provide said extended display area, and to automatically configure said extended display area with the desired relative display orientation.

2. The device of claim 1, wherein said context sensor comprises a digital compass.

3. The device of claim 1, wherein said context sensor comprises a camera.

4. The device of claim 1, wherein said indication of the desired relative display orientation is responsive to a manipulation of said device that does not involve physical contact between said primary display and said remote display.

5. The device of claim 1, wherein said indication is responsive to a particular antenna of a set of antennas being used to trigger a connection with said remote display, and
   wherein the connection module is to determine the desired relative display orientation as corresponding to an orientation associated with said particular antenna according to a predetermined scheme.

6. A method comprising:
   providing an indication of a desired relative display orientation between first and second portions of an extended display area to be jointly and wirelessly displayed by a primary display and a remote display of first and second wireless communication devices, said indication responsive to a tilting or a rotation of said first device;
   determining the desired relative display orientation between the primary and remote displays based on said indication corresponding to a direction of said tilting or rotation; and
   automatically configuring said extended display area with said relative display orientation.

7. The method of claim 6, comprising associating said primary and remote displays to provide said extended display area.

8. The method of claim 6, comprising sensing said manipulation of the first wireless communication device using a context sensor selected from the group of sensors consisting of a digital compass, a camera, and a set of antennas.

9. The method of claim 8, wherein said context sensor comprises a set of antennas, and wherein providing said indication of the desired relative display orientation comprises triggering a connection between said first and second devices using a particular antenna of said set, which corresponds to a particular orientation according to a predetermined scheme.

10. The method of claim 6, comprising sensing the tilting or a rotation of said first device in the direction corresponding to the desired relative display orientation.

11. The method of claim 6, wherein said indication of the desired relative display orientation is responsive to a manipulation of said device that does not involve physical contact between said primary display and said remote display.

12. An article comprising a computer-readable storage medium containing a plurality of instructions that when executed enable a system to:
   provide an indication of a desired relative display orientation between first and second portions of an extended display area to be jointly and wirelessly displayed by a primary display and a remote display of first and second wireless communication devices, said indication responsive to a tilting or a rotation of said first device;

determine the desired relative display orientation between the primary and remote display based on said indication corresponding to a direction of said tilting or rotation; and automatically configure said extended display area with said relative display orientation.

13. The article of claim 12, comprising instructions that when executed enable the system to associate said primary and remote displays to provide said extended display area.

14. The article of claim 12, comprising instructions that when executed enable the system to sense said manipulation of the first wireless communication device using a context sensor selected from the group of sensors consisting of a digital compass, a camera, and a set of antennas.

15. The article of claim 14, said context sensor comprising a set of antennas wherein providing said indication of the desired relative display orientation comprises instructions that when executed enable the system to trigger a connection between said first and second devices using a particular antenna of said set, which corresponds to a particular orientation according to a predetermined scheme.

16. The article of claim 12, comprising instructions that when executed enable the system to sense the tilting or a rotation of said first device in the direction corresponding to the desired relative display orientation.

17. The article of claim 12, wherein said indication of the desired relative display orientation is responsive to a manipulation of said device that does not involve physical contact between said primary display and said remote display.

* * * * *